J. C. BARRETT.
MEASURING INSTRUMENT.
APPLICATION FILED DEC. 29, 1916.

1,308,751.

Patented July 8, 1919.
2 SHEETS—SHEET 1.

Inventor
J. C. Barrett
By his Attorney
P. F. Bourne

J. C. BARRETT.
MEASURING INSTRUMENT.
APPLICATION FILED DEC. 29, 1916.
1,308,751.
Patented July 8, 1919.
2 SHEETS—SHEET 2.
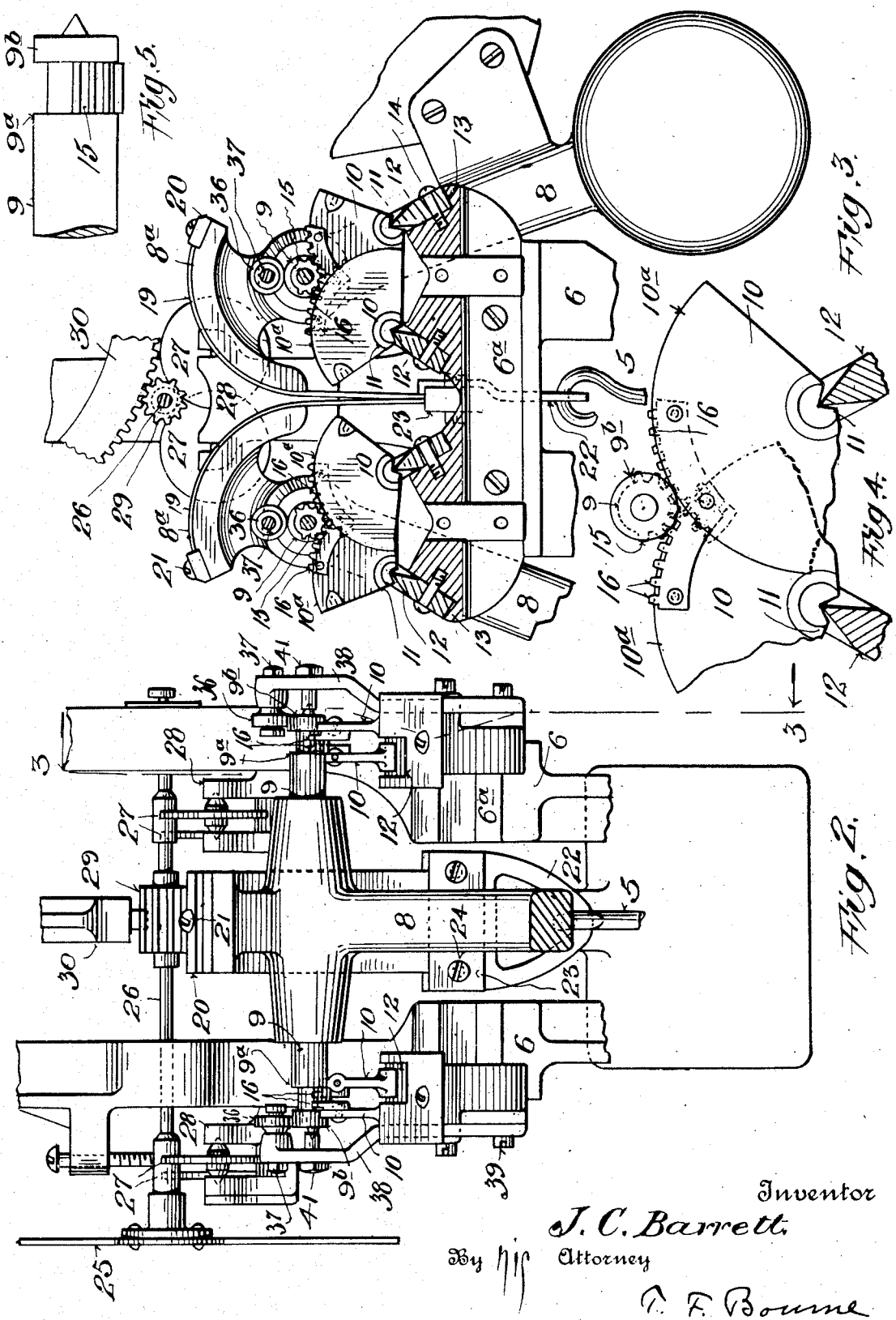

UNITED STATES PATENT OFFICE.

JOSEPH C. BARRETT, OF BROOKLYN, NEW YORK.

MEASURING INSTRUMENT.

1,308,751.  Specification of Letters Patent.  Patented July 8, 1919.

Application filed December 29, 1916. Serial No. 139,480.

*To all whom it may concern:*

Be it known that I, JOSEPH C. BARRETT, a citizen of the United States, and resident of New York city, borough of Brooklyn, in the county of Kings and State of New York, have invented certain new and useful Improvements in Measuring Instruments, of which the following is a specification.

My invention relates to improvements in the class of weighing scales wherein a lever or weighted arm having pivots is supported for rocking movements upon movable members, which in turn are supported to rock in a frictionless manner, and one of the objects of my invention is to permit such members to have rocking movement without influencing one by the other under the influence of the rotative pivots supported thereby, and yet to cause such members to tend to maintain their relative positions, whereby the movement of one member caused by the rotation of a pivot thereon will not influence the movement of an associate member, and whereby the indicating mechanism will always return to zero.

Another object of my invention is to provide means to retain the pivots of the lever or weighted member approximately in their operative positions and yet not to interfere with the proper action of such pivots in case they should be jarred while in use.

My invention comprises novel details of improvement and combinations of parts that will be more fully hereinafter set forth and then pointed out in the claims.

Reference is to be had to the accompanying drawings forming part hereof, wherein, Figure 1 is a front elevation of a portion of a scale mechanism embodying my invention, part of the dial being omitted;

Fig. 2 is a side view of the scale mechanism, part of the frame being omitted;

Fig. 3 is a section substantially on the line 3, 3, in Fig. 2;

Fig. 4 is an enlarged detail view,

Fig. 5 is a detail of one of the pivots 9, and

Similar numerals of reference indicate corresponding parts in the several views.

Figures 1, 6:
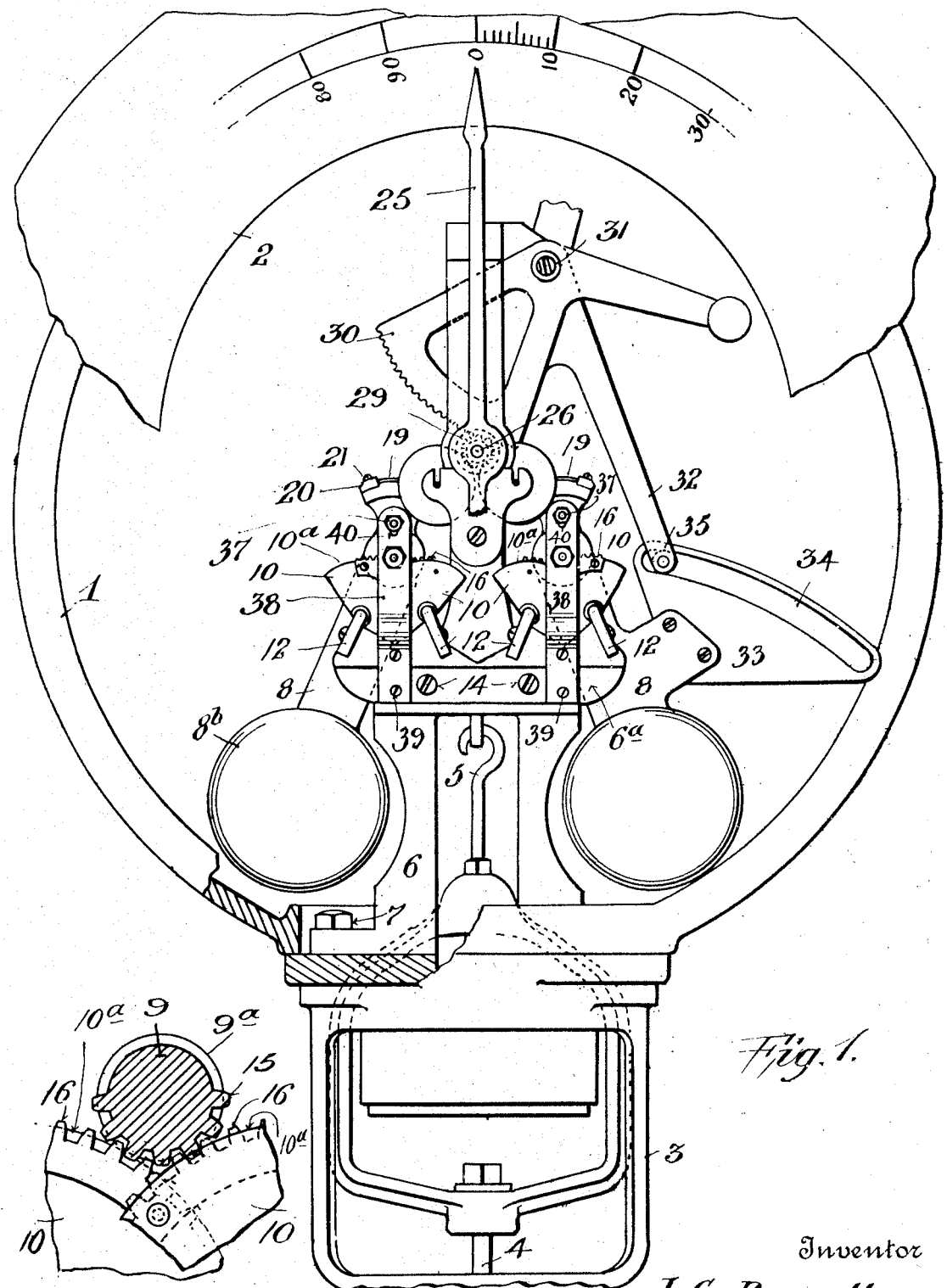
Fig. 6 is an enlarged sectional detail.

The numeral 1 indicates a suitable casing or frame adapted to contain the weighing mechanism hereinafter described. Casing 1 is shown provided with a suitable dial 2 adapted to be applied thereto in any suitable manner. Casing 1 is shown provided with a standard or upright 3 which may be supported in any well-known manner, as from a platform provided with equalizing levers or the like connected in any desired manner with draft mechanism, such as draft rod 4 shown provided with a hook 5. A suitable frame is indicated at 6, and supported upon standard 3 within frame 1 in an ordinary manner, being shown secured to standard 3 by screws 7. At 8 is indicated a suitable weighted lever or arm supported by frame 6 and adapted for connection with the draft mechanism, as with the hook 5. The scale mechanism may be provided with one or more levers 8 supported in a manner hereinafter described, hence a description of one of such levers and its supporting and operating mechanism will suffice. Between the ends of levers 8 it is provided with laterally disposed pivots or gudgeons 9, that are respectively supported upon corresponding pairs of spaced movable members 10 having correspondingly curved upper surfaces $10^a$ upon which the curved surfaces $9^a$, $9^b$ of the pivots rest, whereby the latter may roll or rotate upon such members. The pairs of members are located side by side in lapped relation and are separately supported to rock as influenced by the corresponding pivots 9. As illustrated, the under sides of members 10 are provided with V-like or triangular recesses at 11 receiving knife edge supports 12, the edges of which are in the apices of the corresponding recesses of members 10, the latter thereby being supported to rock freely in a substantially frictionless manner. The knife edges 12 are shown supported upon frame 6, and to securely hold said knife edges in proper relation to the members 10, and from movement, I have shown bracket or block $6^a$ secured on frame 6 and provided with recesses at 13, in which the knife edges are set, and said knife edges may be there secured by screws 14 passing through the knife edges and entering said brackets. As illustrated the knife edges 12 are so located that planes passing through the apices or sharpened ends of the knife edges coincide at the axes of the pivots or gudgeons 9 of lever 8, the apices of the recesses 11 of the corresponding members 10 also lying in such corresponding planes. By this means the weight of lever 8 and the weight imposed upon said lever is transmitted to the corresponding members 10, and to the underlying knife edges along or in the direction of such planes, from the points on the peripheries of the pivots 9 where they touch the peripheries of the corresponding members 10 in such planes, whereby direct thrusts of the weight are imposed through members 10 upon the knife edges in any position of said members. By the means described the members 10 are delicately yet positively supported to rock or oscillate upon the knife edges with a minimum of friction in either direction of movement of such members as caused by the rotation of the pivots or gudgeons in contact therewith, in varying positions in which the lever 8 may be tilted by reason of the load upon the platform or scale pan through the draft mechanism connected with the lever. The construction described is further advantageous and beneficial since it affords protection against the accumulation of dust and other foreign matter between members 10 and their supports 12, which would have a tendency to detract from the accuracy of action of the scale mechanism, and is superior to the support of a weighted lever in a scale mechanism upon rollers upon ordinary annular bearings which are adapted to accumulate dust and foreign substances, as well as oil, and thereby detract from the accuracy of the scale from time to time. Each member 10, as illustrated, will partake of movements imparted to it by the corresponding pivot 9, but neither member will influence the rotation of the other member. It might occur, however, that, since members 10 operate independently of one another, one or another of such members might temporarily be displaced from its normal relation to the corresponding pivot 9, or to the associate member 10, by reason of shocks or jars to which the scale mechanism might be subjected, with the consequent possibility of displacing the indicating mechanism, hereinafter described, temporarily from its normal zero or some other position. I therefore provide means to retain the members 10 in operative relation to the pivots 9 under all conditions of operation and at zero. For such purpose, I have illustrated means coactive between the pivots 9 and the corresponding pairs of rocking members 10 to prevent the latter from being displaced from their normal relation to the pivots. For such purpose each pivot 9 is shown provided with teeth or a pinion at 15, each of which is shown located between the corresponding pair of members 10 and in mesh with teeth or toothed segment 16, upon the corresponding member 10. By preference said teeth or toothed segments will be made separately and secured by screws or rivets upon the inner sides of the members 10. The teeth 15 are located between annular bearing surfaces $9^a$, $9^b$ on pivots 9 which respectively rest and operate upon the corresponding movable member 10, the racks 16 being located in the space between the corresponding bearing surfaces $9^a$, $9^b$ (see Fig. 2). The relation of the teeth 15 and 16 with respect to one another is such that while they are in mesh they do not influence the rotation of the pivots 9 as the annular peripheries $9^a$, $9^b$ of the latter bear upon the curved surfaces $10^a$ of the members 10, and thereby cause the latter to rock on their supports in accordance with the rotation of the corresponding pivot. In the example illustrated, the teeth 15, 16 are not intended to touch the material at the bottom of the opposing teeth, so as not to influence the operation of the pivots 9 upon the members 10, and the teeth are preferably made with suitable clearance at their pitch lines so that the members 10 may rock as influenced by the rotation of pivots 9 thereon without resistance from said teeth, while the teeth prevent the members 10 from undesired displacement with respect to their normal positions respecting the pivots. By the means described, when the pivots rotate and cause movement of members 10, the latter rocking upon their supports, the teeth will correspondingly operate with the desired freedom between them without causing the members 10 to be moved differently than as actuated by the pivots 9 resting thereon, yet upon return of said parts to zero the teeth will cause restoration of the members 10 to their normal positions. The arrangement is of great advantage, because if the members 10 should be displaced from their proper or normal positions relatively to the pivots 9, friction between said members and pivots might arise sufficient to cause inaccurate indication of the weight of an article being weighed, and if a member 10 became so displaced from its normal position as to cause a side face of its recesses 11 to engage the adjacent knife edge 12 proper rotation of such member would be prevented, with consequent skidding of the corresponding pivot 9 on such member, resulting in inaccurate indication of the weight of an article being weighed.

The outer end of lever 8 may be connected with the draft mechanism in any suitable manner. For such purpose I have shown the upper ends of the levers provided with curved surfaces at $8^a$ upon which flexible connections 19 operate, the upper ends of said connections being connected to the levers 8 by means of blocks 20 connected to said connections and secured upon the levers by screws 21, the lower ends of the connections 19 being shown provided with loop 22 to which the draft member or hook 5 is attached, said loop being secured to the adjacent ends of connections 19 by means of a block 23 and screws 24. By the means described when the draft mechanism is operated by the weight upon the scale platform, pan or the like, the connections 19 will be pulled down whereby the levers 8 will be tilted, their pivots 9 rolling upon the movable members 10 as before described. In case a single lever is used there would be a single connection 19 therefrom to the draft mechanism.

In the example illustrated the lever 8 is utilized to cause operation of means to indicate the weight of the article being weighed. While any suitable or well known means may be provided and operated by lever 8 for such purpose, I have indicated a pointer 25 adapted to sweep over dial 2 in a well known manner, which pointer is suitably connected with a shaft 26. While shaft 26 may be supported in any suitable manner, I have shown said shaft resting upon pairs of rollers 27 that are journaled in bearings on brackets 28 supported upon frame 6 in any suitable relation. A pinion 29 is secured upon shaft 26 and is adapted to engage with a rack 30 that is operatively connected with lever 8. As illustrated, the rack 30 is pivotally supported at 31 upon frame 6 and is connected with an arm 32. The arm 32 is adapted to be operated by lever 8, for which purpose said lever is shown provided with an actuator 33 that is shown provided with a cam-like groove 34 receiving a roller 35 carried by arm 32. By the arrangement described when the lever 8 is caused to rock by the weight of the article being weighed, the weighted end of the lever and the actuator 33 will rise, and said actuator will, through arm 32, move rack 30 a proper distance, thereby causing the corresponding rotation of pinion 29 and the pointer or indicator 25 with respect to the dial.

In order to retain the pivots of the lever or levers in proper relation to their supporting members 10, I have shown rollers 36 located over the end portions of said pivots and carried by shafts or supports 37 mounted upon arms 38 that are secured upon bracket 6, as by screws 39. Said arms are shown provided with slots 40 (Fig. 1), whereby the shafts or studs 37 with the rollers 36 may be adjusted relatively to the pivots 9. By such means rollers 36 may be adjusted quite close to the pivots 9, either in contact therewith or just out of contact therewith, and, by being located above the pivots, limit the rise thereof while at the same time should said pivots rise from the members 10, as by reason of jarring or shocking of the machine, no injury will occur to the pivots, and in case such jarring or shocking occurs during weighing operation, as when an article is suddenly deposited or thrown upon the scale platform, pan or the like, causing the pivots 9 to tend to rise from the members 10, said pivots, by encountering the rollers 36, may freely rotate under the influence of the weight upon the draft appliance.

At 41 are screws shown carried by the arms 38, and opposing the corresponding pivots 9 to limit endwise movement of the latter. The ends of the pivots may be tapered to engage flat or suitably shaped or recessed ends of the screws 41, or the latter may be tapered to coact with the ends of the pivots 9, in a well known manner.

In accordance with my improvements the lever or levers 8, being delicately supported for operation in a frictionless manner upon the knife edges, will assure most accurate indication of the weights of articles being weighed, and since means are provided for causing the members 10 to always be in their normal operative positions, when the pointer or indicator is at zero, accurate indication of the weight will be assured. Furthermore, since the members 10 have movements independent of each other, as derived from the rotation of the pivots 9 thereon, said members will always rotate a proper distance under the influence of the pivots 9, and upon the return of the indicator or pointer to zero, said members will return to their normal positions by reason of the rotation of the pivots in conjunction with the action of the teeth 15, 16 ready for the next weighing operation.

Having now described my invention what I claim is:—

1. A measuring instrument comprising a lever having pivots, movable members adapted to support said pivots, means movably supporting said members, and means to cause said members to return to their normal position after an operation thereof.

2. A measuring instrument comprising a lever having pivots, movable members adapted to support said pivots, means movably supporting said members, and means to maintain said members in operative relation to said pivots.

3. A measuring instrument comprising a lever having pivots, movable members adapted to support said pivots, knife edges for supporting said members, and means to cause said members to return to their normal positions after an operation thereof.

4. A measuring instrument comprising a lever having pivots, movable members adapted to support said pivots, means movably supporting said members, and intermeshing teeth between said pivots and the corresponding members for causing said members to maintain operative relation of the members to the pivots.

5. A measuring instrument comprising a lever having pivots, pairs of movable members spaced apart adapted to support said pivots, teeth carried by said members and teeth carried by the corresponding pivots and in mesh with the first named teeth, said members supporting said pivots independently of said teeth whereby the latter may have free play with respect one to another, and means to movably support said members.

6. A measuring instrument comprising a lever having pivots provided with spaced bearing portions, said pivots having teeth between said bearing portions, movable members adapted to support the bearing portions of said pivots and provided with teeth in mesh with the teeth of the corresponding pivot, and means movably supporting said members.

7. A measuring instrument comprising a lever having pivots provided with spaced bearing portions, said pivots having teeth between said bearing portions, movable members adapted to support the bearing portions of said pivots and provided with teeth in mesh with the teeth of the corresponding pivot, said members having recesses and knife edges entering said recesses and supporting said members.

8. A measuring instrument comprising a weighted member, movable members supporting said weighted member, and means to cause said members to return to their normal positions after a weighing operation.

9. A measuring instrument comprising a weighted member, movable members supporting said weighted member, and means coactive with said weighted member and said movable members to cause the latter to return with the weighted member to zero after a weighing operation.

10. A measuring instrument comprising a lever having pivots, movable members adapted to support said pivots, means movably supporting said members to rock under the pivots, rollers opposing the pivots above said members, and means rotatively supporting said rollers.

11. A measuring instrument comprising a lever having pivots, movable members adapted to support said pivots, means movably supporting said members to rock under the pivots, rollers opposing the pivots above said members, arms having slots adjacent to the pivots, shafts adjustably carried in the slots, said shafts supporting said rollers, and means rigidly supporting said arms.

Signed at New York city, in the county of New York, and State of New York, this 26th day of December, A. D. 1916.

JOSEPH C. BARRETT.

Witness:
T. F. BOURNE.